UNITED STATES PATENT OFFICE.

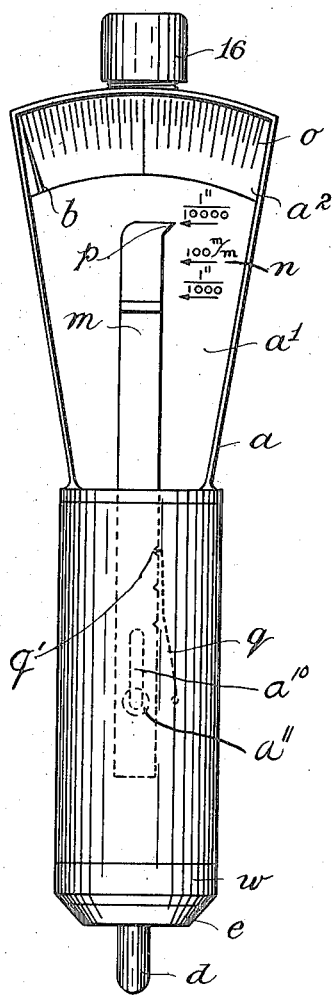
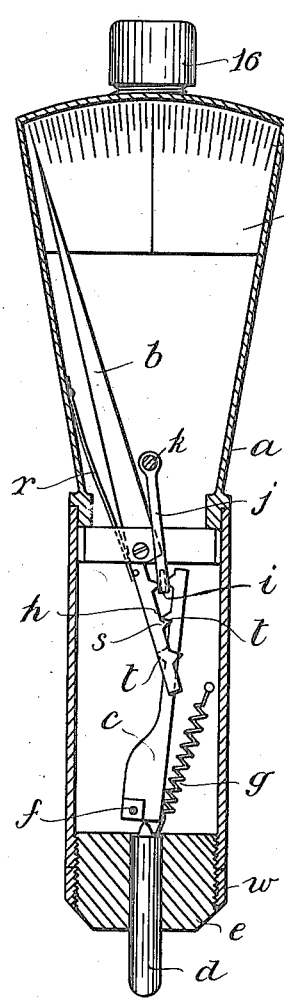
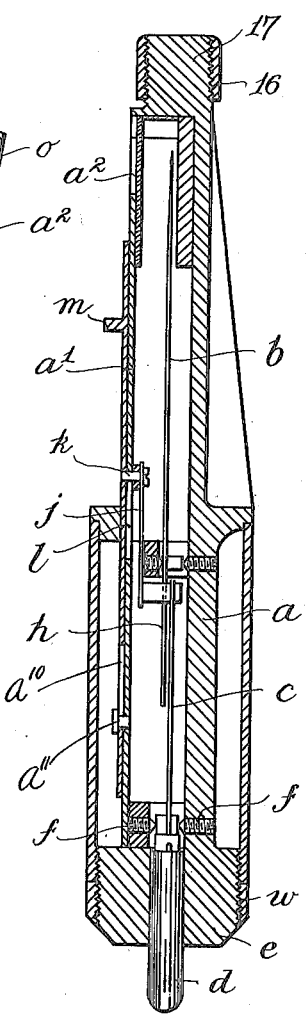

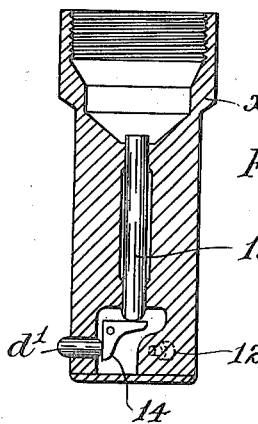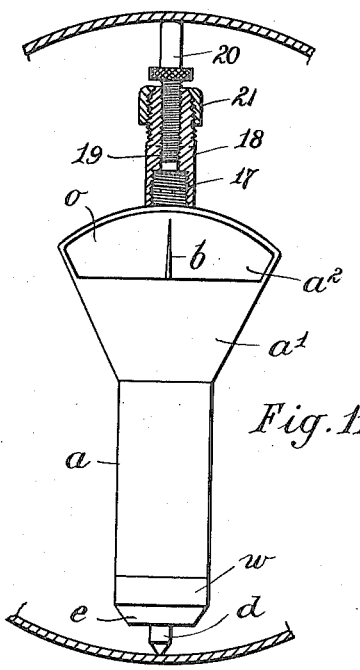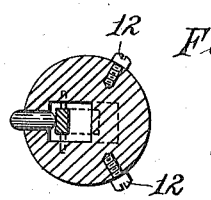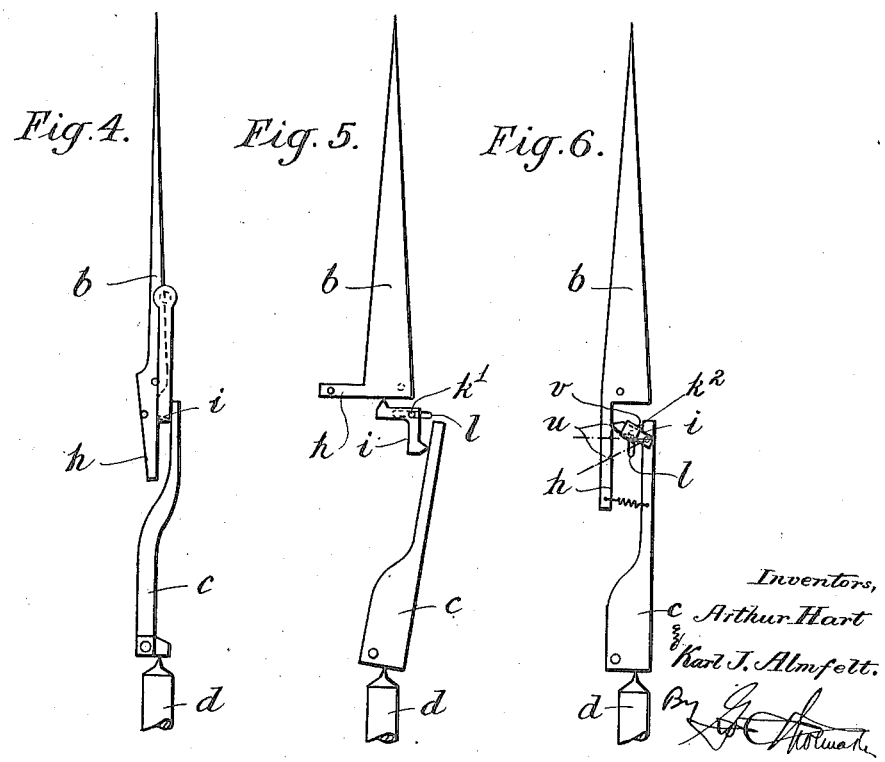

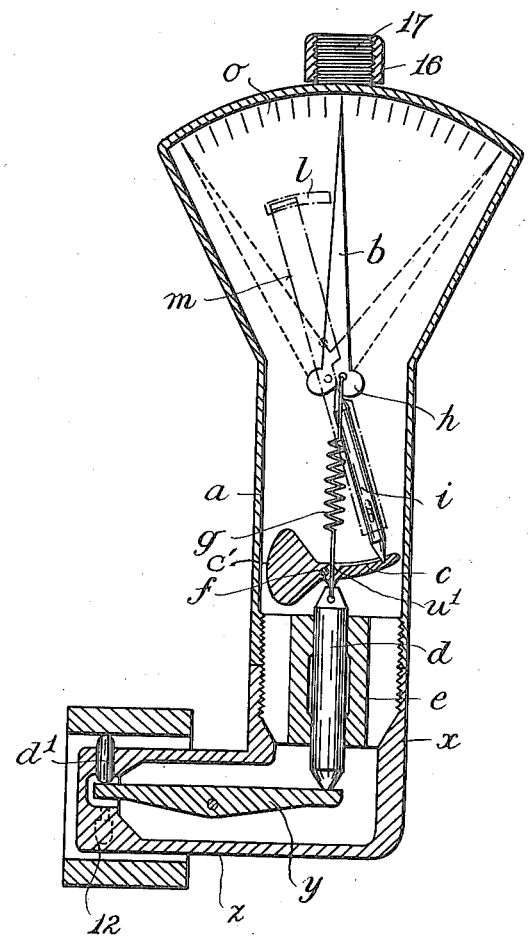
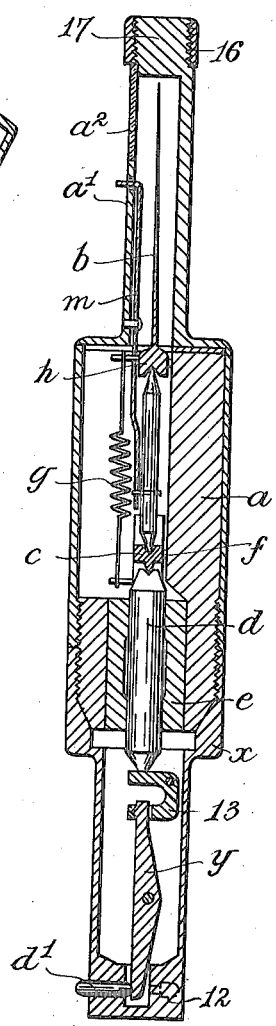

ARTHUR HART AND KARL JOHAN ALMFELT, OF LUTON, ENGLAND.

MEASURING INDICATOR OR GAGE.

1,257,483.  Specification of Letters Patent.  Patented Feb. 26, 1918.

Application filed April 18, 1916. Serial No. 92,062.

*To all whom it may concern:*

Be it known that we, ARTHUR HART and KARL JOHAN ALMFELT, subjects of the King of England and the King of Sweden, respectively, and residents of Luton, in the county of Bedford, in the Kingdom of England, have invented certain new and useful Improvements in Measuring Indicators or Gages, of which the following is a specification.

This invention relates to improvements in measuring indicators or gages of the micrometer kind in which the movement of a projecting pin adapted to be engaged by the article to be measured is transmitted to a spring controlled pointer moving over a scale.

The primary object of the present invention is to provide an adjustable test measuring gage or indicator of the above kind which will be accurate in use, of simple and reliable construction and which can be adjusted as to the units indicated by the pointer to suit varying kinds of work.

The invention is illustrated in, and hereinafter described with reference to the accompanying drawings, in which:—

Figure 1 is a front elevation of one convenient form of micrometer, indicator, or gage.

Fig. 2 is a sectional front view thereof;

Fig. 3 is a sectional side elevation of said instrument;

Figs. 4, 5 and 6, are three detail views showing in front elevation slightly modified forms of adjustment mechanism for effecting the desired variation in leverage.

Fig. 7 is a sectional front elevation illustrating a further slightly modified form of levers with their intermediate adjustment mechanism and showing also an additional lateral measuring attachment applied thereto;

Fig. 8 is a sectional side elevation of the body of the instrument shown in the preceding figure but showing another form of axial attachment applied thereto;

Fig. 9 is a sectional detail view and

Fig. 10 is a sectional plan view of a further modified form of attachment for use with either of the instruments previously described, and Fig. 11 is a partial sectional front elevation of an instrument showing the upper adjustment tip or pin in section and the instrument applied to the interior of a ring.

As shown, and referring generally to the various figures of the drawings, the improved instrument conveniently comprises a main frame or casing $a$ upon or within which the pointer $b$ and the transmission lever $c$ are arranged. At its one or upper end this casing $a$ is of fan or quadrant form as shown and is provided with a partial cover plate $a'$ and a glass panel $a^2$ through which the pointer $b$ can be viewed while at its other or lower end the casing is of substantially cylindrical form with the measuring pin $d$ extending therefrom and sliding in a guide sleeve $e$ formed on the casing $a$. The movement of the pin $d$ is not directly transmitted to the two armed lever or pointer $b$ but it bears by means of a knife edge or point bearing upon the end of an intermediate transmission lever $c$ which is fulcrumed at $f$, being kept up to its work by means of a tension spring $g$. This intermediate lever $c$ transmits its movements to the lower arm or extension $h$ of the pointer $b$ through the intermediary of a movable adjustment member $i$ which may be manipulated or adjusted by means of suitable mechanism. For instance in the construction shown in Figs. 1 to 3 of the drawings the member is carried by or formed on an arm $j$ which is pivotally mounted on a pin $k$ passing through a slot $l$ in the cover $a'$ and secured in a finger piece or slide $m$ operable from the outside of the instrument, as clearly shown in Fig. 3. By this means the leverage can be adjusted as desired, and by suitably calibrating the face of the plate $a'$ as shown at $n$ in Fig. 1 the pointer $b$ can be made to indicate any desired units upon a common scale $o$. Conveniently a point $p$ may be formed on the slide $m$ and a friction spring $q$ may be provided to retain the slide in any position to which it has been moved. The spring $q$ is adapted to engage any one of a series of notches $q'$ in one edge of the slide $m$. The distance between each notch corresponds with the distance between the different graduations on the plate $a'$ and when the slide $m$ is adjusted the spring engages the different notches and retains the slide in its adjusted position. In the lower part of the slide $m$ an elongated slot $a^{10}$ is provided, which slot is adapted to coöperate with a pin $a^{11}$ in the lower part of the plate $a^1$. By means of this construction, the slide $m$ is guided in its movement and is also limited in its upward and downward movement. A suitable returning spring *r* is arranged to bear on the extended end *h* of the pointer *b* as shown. The spring *r* is stronger than the spring *g* and consequently the pin *d* is normally held extended without the casing, the spring *g* holding the said pin in engagement with the lever *c*. In operation it will be seen that the leverage between the pin *d* and the pointer will vary as the adjustment member *i* is moved between the arms of the lever *c* and the pointer *b* thus causing the readings of the pointer on the scale to vary in accordance with the predetermined movements of the slide *m*. The extension *h* and lever *c* are preferably as shown in Fig. 2 formed with opposed points or knife edges *s* and *t* respectively between which the adjustment member *i* is moved step by step and this arrangement insures that the member *i* must always be in one of its predetermined positions and that any slight variations in its position will not affect the readings of the pointer as could happen where the leverage is gradually variable as is illustrated in the slightly modified arrangement shown in Fig. 4 of the drawings.

If desired the variation in leverage may be effected by making the intermediate member *i* in the form of a bell crank lever as shown in Fig. 5 and by arranging it upon a fulcrum pin *k'* which is laterally slidable in a slot *l* in the frame *a* similarly to the pin *k* in Figs. 2 and 3.

Another method of obtaining the desired variation in leverage is shown in Fig. 6 in which the intermediate member *i* takes the form of a strut which is pivotally mounted on the lever *c* and engages with its pointed end notches *u* in the pointer extension *h* and in this construction the adjustment is effected by means of a sliding pin *k²* as before which moves in a slot *l* and is connected to a sleeve *v* engaging the said strut.

A further modification of this latter method of operation is illustrated with reference to Figs. 7 and 8 in which the strut member *i* is of elongated formation and is adapted to freely engage the underside of the pointer lever extension *h* and to be adjustable in notches *u'* in the lever *c* which is preferably shaped and provided with a counterweight *c'* as shown.

In Figs. 7 and 8 two separate attachments or internal measuring adapters are shown applied to the instrument, the engagement being effected by screwing off the lower ring *w*, Figs. 1, 2, 3, and 11 and by screwing on the internally screwed sleeve *x* of the attachments. In Fig. 7 the attachment sleeve is of elbow form and contains an additional transmission lever *y* upon one end of which the pin *d* is adapted to bear so as to receive motion from the outer pin *d'* proper which extends radially outward from the lateral or horizontal portion *z* of the sleeve *x*. Adjustment to suit the particular size of ring to be measured is effected by means of a pair of radial screws 12 which are set at 120° from each other and from the said pin *d'* as is more clearly shown in connection with the construction shown in Fig. 10 hereinafter described.

In the attachment shown in Fig. 8, the sleeve *x* is straight and an additional U-shaped lever 13 is arranged between the pin *d* and the lever *y* as shown, while in the construction shown in Figs. 9 and 10, a bell-crank lever 14 is interposed between a slidable extension rod 15 adapted to engage the end of the pin *d* and the lateral pin *d'*.

In Fig. 11 of the drawings the instrument is shown applied to the measurement of the internal diameter of a ring of relatively large diameter and for such purposes the cover ring 16 is removed from the screwed extension or nipple 17 and a connecting sleeve 18 is screwed thereon. This sleeve 18 is internally screw threaded and into it is adjustably screwed the end 19 of a measuring pin 20 which is adapted to engage the work. It is retained in its set position by means of a clamping nut 21 which engages the end of the sleeve 18 which is longitudinally slotted to make it yieldable to the nut 21. By this means it will be understood that the device can be used for large internal measurements within wide limits by using pins of suitable length, for intermediate measurements by the use of the attachment sleeves, and for various dimensions by fixing the instrument in position above a fixed platen or other device.

What we claim is:—

1. A measuring gage comprising a casing carrying a graduated scale, a measuring pin projecting therefrom, a movable pointer in said casing, a transmission lever in engagement with said measuring pin, an adjustable intermediate transmission member interposed between the transmission lever and the pointer for varying the leverage of the transmission lever.

2. A measuring gage comprising a casing carrying a graduated scale, a measuring pin projecting therefrom, a movable pointer in said casing, a transmission lever in engagement with said measuring pin, an adjustable intermediate transmission member interposed between the transmission lever and the pointer, and means connected to the intermediate member for adjusting the same for varying the leverage of the transmission lever.

3. A measuring gage comprising a casing carrying a graduated scale, a measuring pin projecting therefrom, a movable pointer in said casing, a transmission lever in engagement with said measuring pin, an adjustable intermediate transmission member interposed between the transmission lever and the pointer, and a slide connected to the intermediate member for adjusting the same for varying the leverage of the transmission lever.

4. A measuring gage comprising a casing carrying a graduated scale, a measuring pin projecting therefrom, a movable pointer in said casing, a transmission lever in engagement with said measuring pin, an adjustable intermediate transmission member interposed between the transmission lever and the pointer, a slide connected to the said intermediate transmission member for adjusting the same, and means for retaining the slide in its adjusted position.

5. A measuring gage comprising a casing carrying a graduated scale, a pivoted pointer in said casing, a spring controlling said pointer, a measuring pin projecting from said casing, a transmission lever in operative contact with said pin, a spring connected to said pin for holding the same in engagement with said transmission lever, an intermediate transmission member between said transmission lever and said pointer, a slide outside of the casing and connected to said intermediate member for adjusting the same, and a spring for retaining the slide in its adjusted position.

6. A measuring gage comprising a casing, a measuring pin projecting therefrom, a pointer pivoted in said casing, adjustable intermediate mechanism for transmitting the movement of the measuring pin to the pointer, and means for detachable connection with the casing for enlarging its measuring capacity, said means comprising a nipple secured to the casing, a sleeve adapted to be screwed onto said nipple, a pin in screw-threaded engagement with said sleeve and adjustable therein, and a clamping nut for holding the pin in its adjusted position.

7. A measuring gage comprising a casing, a measuring pin projecting therefrom, a pointer pivoted in said casing, adjustable intermediate mechanism for transmitting the movement of the measuring pin to said pointer, and means for detachable connection with said casing for enabling the gage to measure different types of articles, said means comprising an extension, a lever pivoted in the extension adapted to be attached to the casing, and a pin projecting from said extension, the opposite ends of the pivoted lever respectively engaging the pin projecting from the casing and the pin projecting from the extension, whereby the movement of the pin in the casing is transmitted to the pin in the extension.

8. A measuring gage comprising a casing, a measuring pin projecting therefrom, a pointer pivoted in said casing, a pivoted main transmission lever in the casing and engaging the measuring pin, an intermediate transmission lever interposed between the pointer and the main transmission lever, a slide mounted on the casing to which the intermediate transmission lever is connected, means for adjusting the slide to move the intermediate transmission lever to different positions relative to the pointer and main transmission lever and thereby vary the leverage of the main transmission lever, and means for holding the slide in its adjusted position.

9. A measuring gage comprising a casing, a measuring pin projecting therefrom, a pointer pivoted in the casing, a main transmission lever pivoted in the casing, one end of said pointer being provided with a plurality of projections, one end of said transmission lever also being provided with a plurality of projections in substantially horizontal alinement with the projections of the pointer, an intermediate transmission member interposed between the pointer and the main transmission lever and adapted to be adjusted to assume a position between either pair of oppositely disposed projections, whereby the leverage of the main transmission lever is varied, and means for adjusting said intermediate transmission lever.

In testimony whereof we hereunder sign our names to this specification.

ARTHUR HART.
KARL JOHAN ALMFELT.